(12) United States Patent
Bach et al.

(10) Patent No.: US 6,377,795 B1
(45) Date of Patent: Apr. 23, 2002

(54) CELLULAR PHONE WITH SPECIAL STANDBY FEATURE

(76) Inventors: Lanae E. Bach; Joseph Bach, both of 17460 Lakeview Dr., Morgan Hill, CA (US) 95037

(*) Notice: Subject to any disclaimer, the term of this patent is extended or adjusted under 35 U.S.C. 154(b) by 0 days.

(21) Appl. No.: 09/038,190

(22) Filed: Mar. 10, 1998

(51) Int. Cl.[7] ............................................. H04M 3/42
(52) U.S. Cl. ...................... 455/417; 455/414; 455/567; 455/445; 379/88; 379/210; 379/214
(58) Field of Search ................................ 455/567, 413, 455/412, 411, 90, 414, 550, 563, 569; 379/88, 210, 214, 67.1, 70, 80; 433/97, 417, 445, 426, 403

(56) References Cited

U.S. PATENT DOCUMENTS

| | | | | |
|---|---|---|---|---|
| 5,276,731 A | * | 1/1994 | Arbel et al. ................... | 379/88 |
| 5,317,624 A | * | 5/1994 | Obana et al. ................. | 455/412 |
| 5,329,578 A | * | 7/1994 | Brennan et al. .............. | 379/67 |
| 5,475,739 A | * | 12/1995 | Norimatsu ................... | 455/569 |
| 5,548,636 A | * | 8/1996 | Bannister et al. ............ | 379/201 |
| 5,553,125 A | * | 9/1996 | Martensson .................. | 379/140 |
| 5,559,860 A | * | 9/1996 | Mizikovsky ................. | 455/413 |
| 5,570,413 A | * | 10/1996 | Ahlberg et al. .............. | 455/552 |
| 5,604,797 A | * | 2/1997 | Adcock ....................... | 379/373 |
| 5,629,693 A | | 5/1997 | Janky ......................... | 340/988 |
| 5,636,265 A | * | 6/1997 | O'Connell et al. .......... | 455/412 |
| 5,657,372 A | * | 8/1997 | Ahlberg et al. .............. | 455/414 |
| 5,669,061 A | | 9/1997 | Schipper ..................... | 455/429 |
| 5,758,280 A | * | 5/1998 | Kimura ....................... | 455/412 |
| 5,845,219 A | * | 12/1998 | Henriksson ................. | 455/567 |
| 5,867,562 A | * | 2/1999 | Scherer ....................... | 379/88 |
| 5,877,724 A | | 3/1999 | Davis .......................... | 342/357 |
| 5,884,160 A | * | 3/1999 | Kanazaki ..................... | 455/413 |
| 5,918,179 A | * | 6/1999 | Foladare et al. ............. | 455/445 |
| 5,933,477 A | * | 8/1999 | Wu ............................. | 379/88.26 |
| 5,945,919 A | | 8/1999 | Trask .......................... | 340/825.491 |
| 5,978,689 A | * | 11/1999 | Tuoriniemi et al. ......... | 455/569 |
| 6,018,671 A | * | 1/2000 | Bremer ....................... | 455/567 |
| 6,070,068 A | * | 5/2000 | Sudo ........................... | 455/414 |

* cited by examiner

Primary Examiner—Dwayne Bost
Assistant Examiner—Joy Contee
(74) Attorney, Agent, or Firm—Joseph Bach

(57) ABSTRACT

A cellular phone is disclosed having a SPECIAL mode of operation. According to one embodiment, in the SPECIAL operating mode a channel of communication is automatically established upon receipt of an incoming call. Additional features enable muting of the ringing after the first ring, and sending a note to the caller that the phone in the SPECIAL mode. This allows a user in a meeting to receive a call and have time to exit the meeting to talk to the caller. According to another embodiment, is the special operating mode the phone blocks all incoming calls for a pre-programmed time period, and thereafter resumes normal operation.

19 Claims, 3 Drawing Sheets

CELLULAR PHONE WITH SPECIAL STANDBY FEATURE

BACKGROUND OF THE INVENTION

1. Field of the Invention

The present invention relates to cellular telephones and, more particularly, to a cellular phone having a special standby feature.

2. Description of Prior Art

As is well known, cellular phones have a POWER button and a SEND button. When the POWER button is in the OFF position, the cellular phone is inoperable and cannot receive incoming calls, nor can it transmit outgoing calls. On the other hand, when the POWER button is in the ON position, the cellular phone is in a stand by mode and can receive incoming calls and transmit outgoing calls by pressing the SEND button. As a side note, in the ON mode, the cellular phone also communicates with base stations to determine reception level, hand-offs, etc. In digital-based cellular system, a voice mail system is available such that when the cellular phone is in the OFF position, the caller may leave a message for the user. The received message is stored in a base station voice mail system.

Because of the convenience offered by cellular telephones, they practically become an essential tool for businessmen and other professionals. However, at times, cellular phones create a distraction. For example, when businessmen hold a meeting, each person has to make a decision whether to turn his cellular phone off or keep it on. On many occasions, the users cannot afford to turn the cellular phone off because of business or other needs. Thus, it often occurs that a meeting is disturbed by the ring of a cellular phone and the user having to answer it.

SUMMARY OF THE INVENTION

The present invention provides a solution to the above noted problem, by providing a SPECIAL standby mode. The invention can be implemented in various ways; however, the basic idea is to have the cellular phone automatically accept the call and to allow the user the opportunity to exit the meeting without having to answer the call and disturb the meeting. Another feature of the invention is to allow the user to make a decision a priory, as to which calls will get through and which will be referred to the voice mail system.

DETAILED DESCRIPTION OF THE PREFERRED EMBODIMENTS

Figure 1:
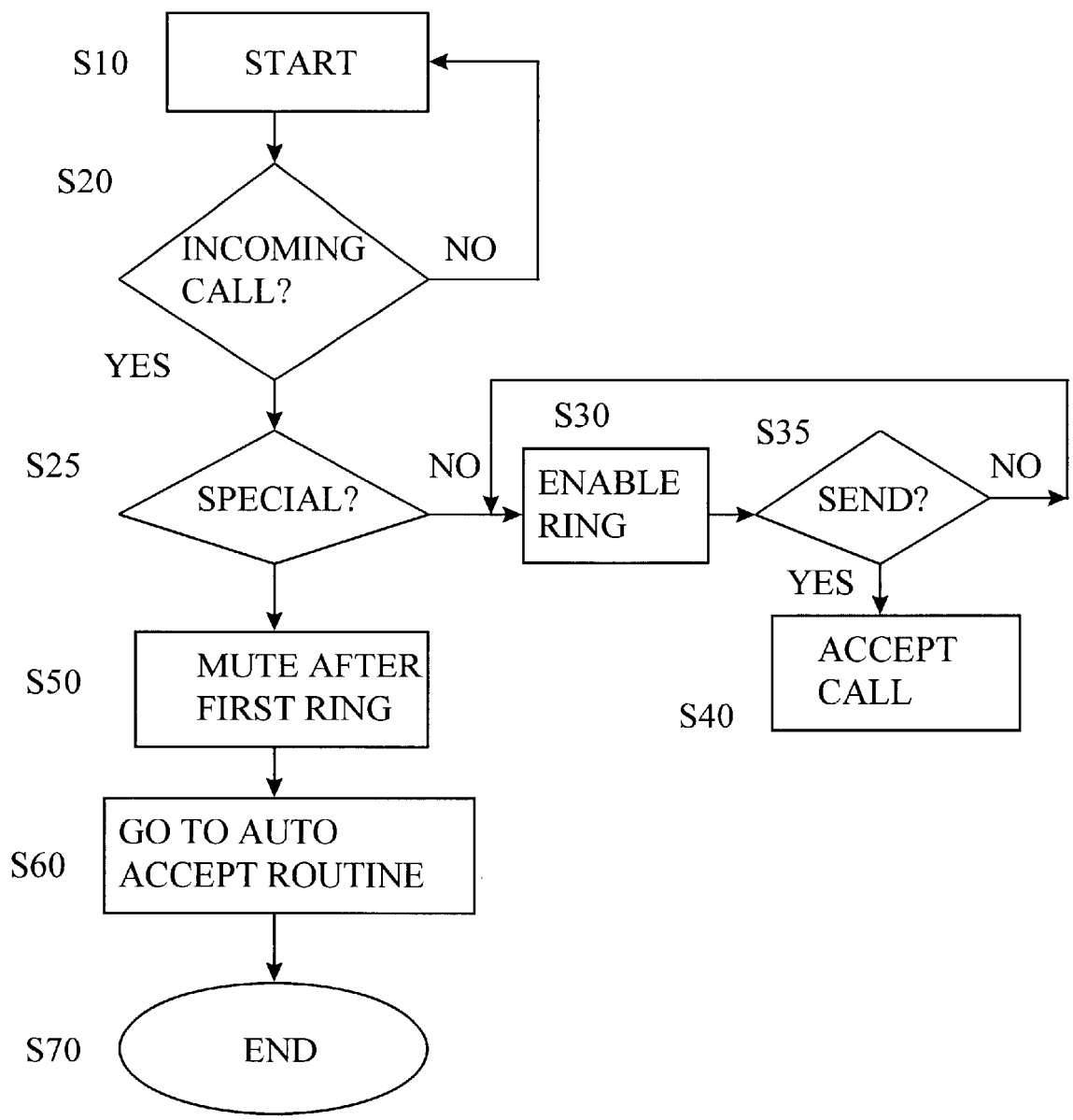
FIG. 1 is a flow chart depicting a routine of handling incoming calls according to an exemplary embodiment of the present invention.

An advantageous feature of the present invention is that it reduces distractions in meetings when a cellular phone receives an incoming call. Basically three elements can be dealt with and, preferably, all three are implemented. The first element is to reduce the disturbance caused by the ringing of the phone. The second element is to reduce the disturbance by having the phone automatically accept the call. The third element is to reduce the disturbance caused by the user having to talk to the caller before having the opportunity to exit the meeting. Various embodiments for implementing the three elements of the invention will now be described.

Regarding the first element, ringing, the solution should be preferably coupled to the solution of the second element. For example, according to one embodiment, in the SPECIAL mode, upon receiving an incoming call signal, the cellular phone rings only once. After the first ring the ringing is muted and the phone may go into the "accepting the call" routine of the second element of the invention. This will reduce the disturbance generally caused by the phone ringing about three times before the user reaching the phone and pressing the SEND button.

Another embodiment for handling the ringing problem is to adapt one of the pagers' solutions, i.e., a vibration or light option replacing the audible ringing. This embodiment seems less desirable, as in many meetings the phone is placed on a table or left in a brief case. Therefore, the "one ring" solution is the preferred embodiment.

Another solution relates to a particular feature of the invention, wherein the user can decide a priory as to which calls will go through and which will be forwarded to the voice mail system. According to this feature, the user is provided the option to preprogram the telephone to accept certain calls, and reject all other. For example, if a person has to go into a meeting, but is expecting an important call, that person can pre-program the phone to accept calls originating from the per-programmed number. Thus, when a call comes in, the phone will check the originating number included in the header of the transmission. If the number does not match any of the pre-programmed numbers, the telephone will reject the call and will not ring. On the other hand, if the originating number does match a pre-programmed, then the telephone would ring for the user to answer the call.

One problem in the prior art phone is that the user has to reach for the phone and press the SEND key in order to accept the incoming call. This creates a distraction, as it takes time for the user to reach for the phone and press the appropriate button, during all of which the phone is ringing. Accordingly, according to the present invention, in the SPECIAL mode, after the first ring (or after a number of rings adjustable by the user) the phone enters a routine to automatically accept the call. The simplest way of doing it is to simply automatically issue the SEND command by a program residing in the internal microprocessor. It would be appreciated that this feature can be incorporated with the feature just described above, so that when a call having the originating number match the pre-programmed number, the phone would automatically accept the call.

The third element of the invention is to allow the user sufficient time to exit the meeting. According to one embodiment, after the phone has automatically accepted the call, a special signal is sent to the calling party. Such signal may be a recognizable audible signal or an actual message informing the caller that the call has been accepted automatically and the user will answer the call shortly. This will put the caller on alert to hold the line and await an answer. Meanwhile, this will enable the user the opportunity to exit the meeting without having to talk to the caller in the meeting.

Regarding the third element, an advantageous feature is provided in the preferred embodiment. Specifically, after automatically accepting the call, a message is sent to the caller indicating that the phone is on SPECIAL mode, and requesting the caller to press a specific key, say # if he wishes to disturb the called party, or press another specified key, say *, if he does not wish to disturb the called party. When the called phone receives the appropriate signal after the calling party has pressed the chosen key, an appropriate indication is provided, to alert the called party. Specifically, if the calling party indicated that he doe not wish to disturb the called party, the called phone automatically execute a termination of call routine, or referral to the voice mail system routine. However, if the calling party wishes to disturb the called party, a special indication is provided by the phone and the communication channel is maintained open.

A specific feature of the above-described embodiment is an urgency rating system. That is, the user is allowed to rate the importance of the call. For example, #1 for urgent, #2 for important, and #3 for routine. If the call is rated #1, the call will go through and the phone would ring. If the call is rated #2, the caller is allowed to leave a message, which is stored in a priority over routine message and are not erased until the user purposely erases them. If the call is rated #3, the caller is allowed to leave a message, which is stored in a priority below #2 calls. Thus, when the user checks his messages, priority #2 messages will be played before priority #3 messages.

FIG. 1 is a flow chart depicting a routine of handling incoming calls as explained above. The routine starts at step S10, and checks for incoming calls at step S20. When an incoming call is detected, the routine checks whether the phone is in the SPECIAL mode in step S25. If not, the routine enables the ring at step S30 and continues to step S35 to see whether the user has pressed the SEND button. When the SEND button is pressed, the communication channel is established in step S40.

On the other hand, if the phone is in the SPECIAL mode in step S25, the routine mutes the ring after the first ring at step S50. Then the routine goes to a routine for automatically establishing the channel of communication. In its most simplistic implementation, this step can be simply a command to go to step S40. On the other hand, it is preferred that the routine depicted in FIG. 2 be used for step S40 of FIG. 1.

Figure 2:
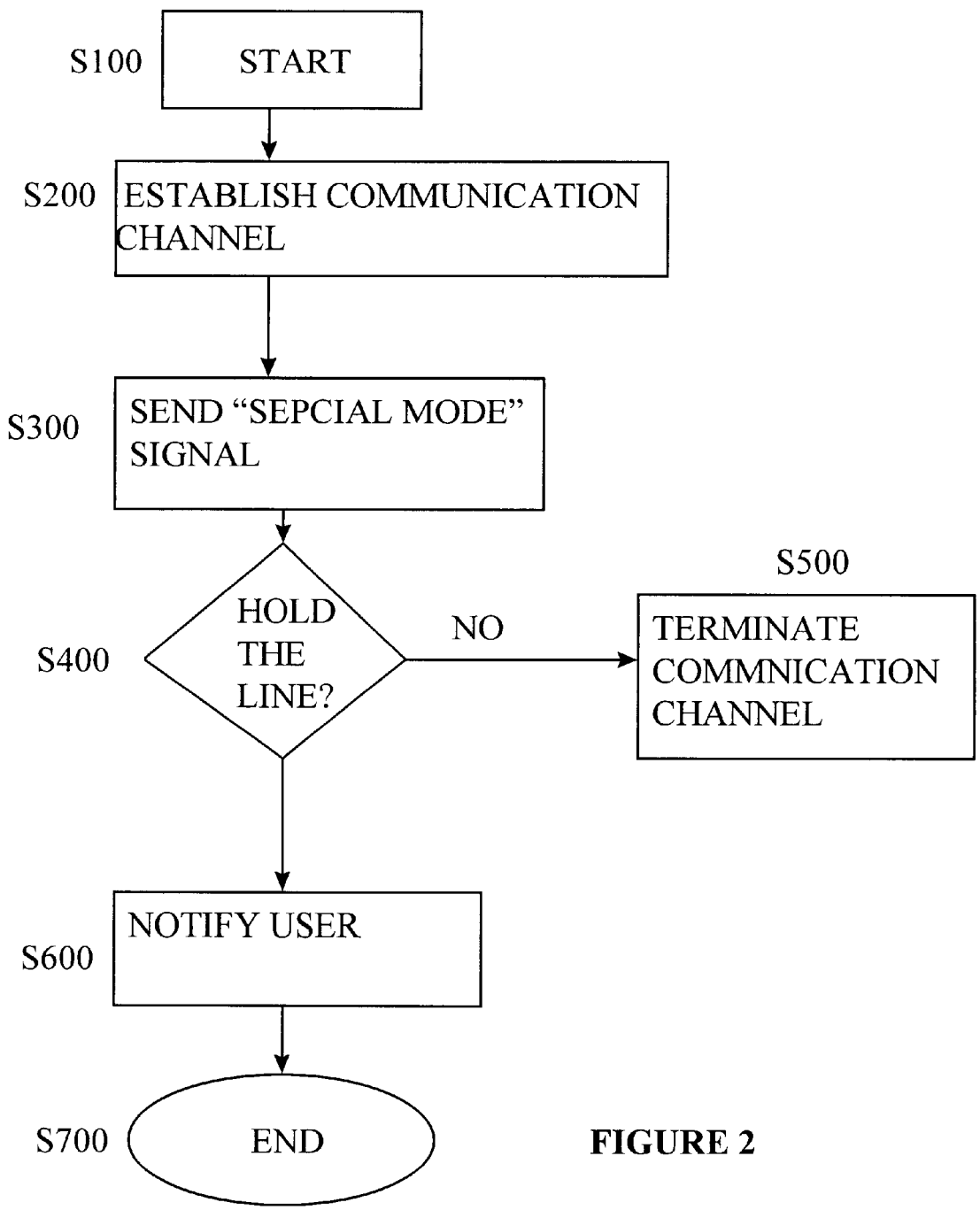
FIG. 2 is a flow chart depicting a routine for automatic call acceptance according to an exemplary embodiment of the present invention.

In FIG. 2, the routine first establishes a channel of communication in step S200. Then, in step 300 it sends a signal to the caller indicating that the called phone is in the SPECIAL mode. In the preferred embodiment, this signal constitute an audible recording previously made by the user. For example, such a message can be; "This is XYZ. My phone is in the SPECIAL mode since I'm in a meeting. If your call is urgent, please press # and I'll exit the meeting. Otherwise please press *." The routine then checks whether to hold the line at step S400. That is, if a # is returned, the channel is maintained. If a * is returned, the channel is disconnected at step 500. It should be noted that, similar to conventional phones, if the caller disconnects rather than returning a signal, the channel is disconnected. Further, rather than disconnecting the call, the caller may be forwarded to a voice mail system to leave a message.

When the channel is to be maintained, the user is notified at step S600. This can be done by, for example, providing a visual notification on the phone's screen, or by changing the background illumination color of the SPECIAL button. This will alert the user that the caller needs the user urgently, and that the channel has been established so that the user may exit the meeting to talk to the caller.

According to another feature of the present invention, the user is provided the option to block all incoming calls for a specified period. For example, the user may specify that all incoming calls should be rejected for 1 hour, when the user knows that the meeting would last one hour. This feature would avoid the need for the user to turn the phone off before the meeting, and forgetting to turn it back on after the meeting. Additionally, using this method the battery charged can be preserved by having the phone turning itself off for the designated period, and turning itself back on automatically when the designated period has elapsed. The only energy which would be required is for the timer, which is generally running in any case in order to memorize dates, etc.

Figure 3:
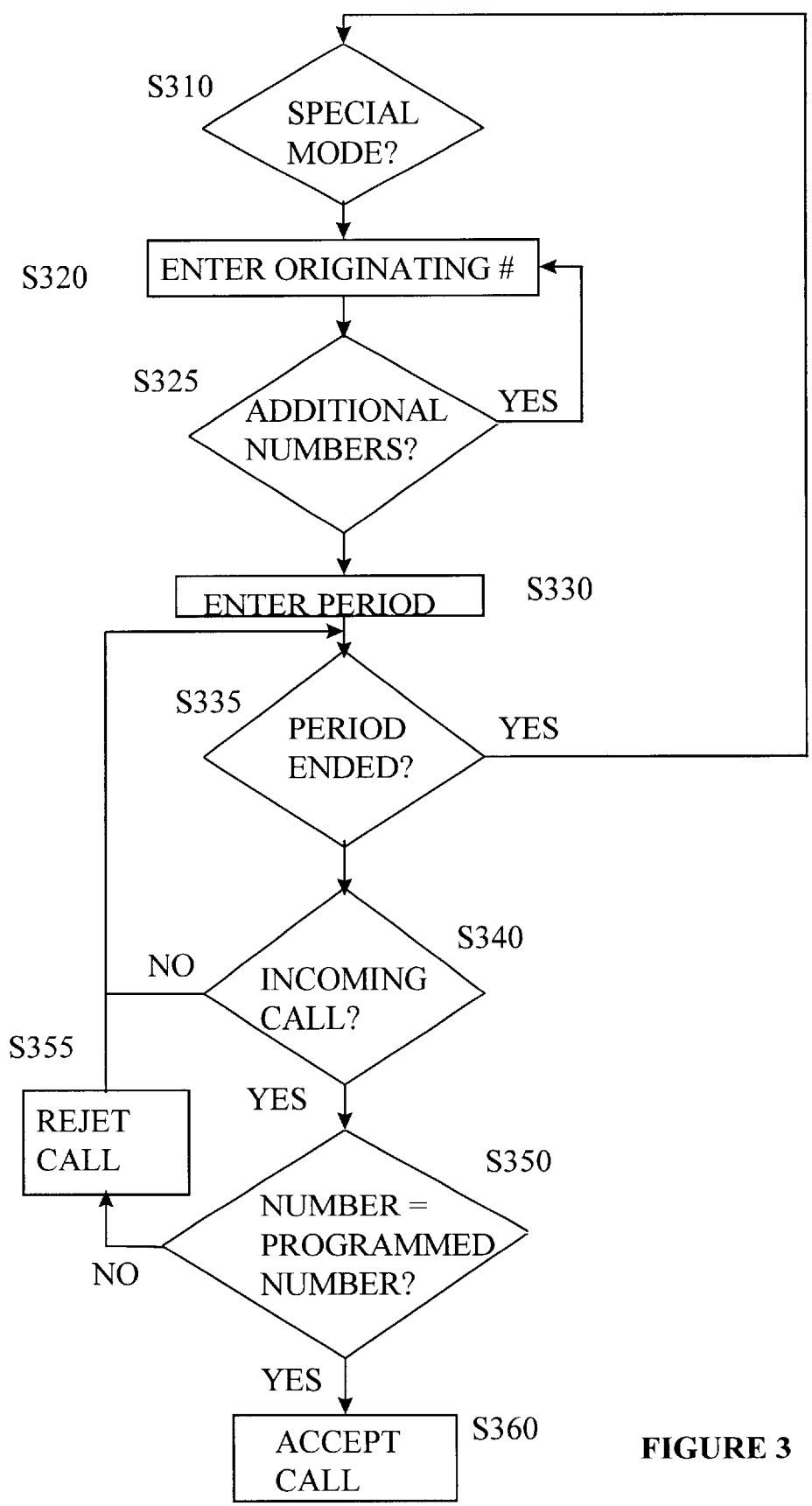
FIG. 3 is a flow chart depicting a routine for special mode call acceptance according to an exemplary embodiment of the present invention.

FIG. 3 is an exemplary flow chart incorporating several of the features disclosed above. When it is determined that special mode has been activated at step S310, the user is prompted to enter telephone numbers for which the user wishes to accept a call at step S320. The entered number is stored in memory (not shown). At step S325 it is checked whether additional numbers are to be entered and, if so, the routine loops back to step S320. If no more numbers are to be entered, the routine proceeds to step S330, wherein the user is prompted to enter a time period for maintaining the special mode. In Step S335 it is checked whether the time period has elapsed and, if so, the routine goes back to check whether special mode has been activated.

If in step S335 it is determined that the period has not elapsed, the routine proceeds to step S340 to check whether a call is incoming. If not, the routine loops back to step S335. If a call is received, the routine proceeds to step S350 to check whether the originating number matches any of the stored numbers. If the number does not match any of the stored numbers, the routine proceeds to step S355 to reject the call, and then to step S335. If the number matches one of the stored numbers, the routine proceeds to step S360 to accept the call. It should be appreciated that at step S360 the routine can employ any of the methods described above to accept the call. For example, the routine can mute the ring after the first ring, as exemplified in the flow chart of FIG. 1, and then can perform the acceptance routine exemplified in FIG. 2.

While the invention has been described with reference to specific embodiments thereof, it would be appreciated by those of ordinary skill in the art that the invention is not limited to these embodiments, and that various modifications can be made without departing from the scope and spirit of the invention, as can be gathered from the specification and claims appended thereto.

What is claimed is:

1. A cellular telephone having a normal operating mode and a special operating mode to enable a conversation between a caller and a user, wherein upon receiving a call in the special operating mode the cellular telephone;
   automatically establishes an audio channel of communication enabling the user to converse with the caller;
   sends a signal to the caller indicating that the cellular phone is in a special operating mode indicating that the user will attend to the call momentarily;
   thereby informing the caller that the caller may begin conversation although the user may not answer.

2. The cellular phone of claim 1, wherein in the special mode the ringing is muted.

3. The cellular telephone of claim 1, wherein in the special mode the telephone verifies that the received call matches a pre-programmed originating call number prior to establishing said audio channel of communication.

4. The cellular telephone of claim 1, wherein in the special operating mode the cellular telephone mutes the ringing after a pre-specified number of rings.

5. The cellular phone of claim 1, wherein in the special mode the telephone further automatically sends a message to the calling party requesting the calling party to indicate the urgency of the call and establishes said audio channel of communication only when the indicated urgency matches a prescribed level.

6. A telephone having an accept button and a normal operating mode and a special operating mode to selectively enable a conversation between a caller and a user, wherein upon receiving a call in the special operating mode the telephone:

alerts the user and monitors the accept button; and, when the accept button is depressed the cellular phone:
establishes an audio channel of communication enabling the user to converse with the caller;
sends a signal to the caller indicating that the cellular phone is in a special operating mode thereby indicating that the caller may begin the conversation although the user may not answer immediately.

7. The telephone of claims 6, wherein in the special operating mode the telephone rejects all incoming calls except for incoming calls matching pre-programmed originating call numbers.

8. A cellular telephone of claim 6, wherein in the special operating mode the cellular telephone automatically sends a message to the calling party requesting the calling party to indicate the urgency of the call.

9. The telephone of claim 8, wherein, in the special operating mode, the telephone notifies the user when the indicated urgency is above a prescribed level, and when the indicated urgency is below said prescribed level the phone performs one of referring the call to a voice mail or terminating the call.

10. The cellular telephone of claim 8, wherein in the special operating mode the cellular telephone blocks all incoming calls having an indicated urgency below a prescribed level for a predetermined period of time, and thereafter resumes normal operation.

11. A user telephone system programmed to operate in one of a normal mode and special mode, said special mode structured to handle incoming calls so as to minimize user disturbance of answering the call, wherein when an incoming call from a caller is received in the special mode the telephone system performs the operations comprising:

a. establishing an audio channel of communication between the caller and the user telephone, thereby enabling the user to converse with the caller;

b. sending a signal to the caller user indicating that the called telephone is in a special operating mode and has accepted the call automatically, thereby informing the caller that the caller may begin the conversation although the user may not answer in order to minimize user disturbance.

12. The telephone of claim 11, wherein upon receiving an incoming call in the special mode the telephone further performs the operations comprising:
muting the ringing after a pre-specified number of rings, said pre-specified number including zero rings.

13. The telephone of claim 11, wherein upon receiving an incoming call in the special mode the telephone further performs the operations comprising:
determining the level of urgency of the incoming call and if the urgency level is below a specified level, transferring the call to a voice mail system.

14. The telephone of claim 13, wherein the telephone determines the level of urgency by sending a request to the caller to indicate the level of urgency and monitoring the caller's response.

15. The telephone of claim 11, wherein said signal is an audible signal pre-recorded by said user.

16. The telephone of claim 11, wherein when an incoming call from a caller is received in the special mode the telephone checks whether an acceptance button has been depressed by the user and, if so, performs operations a and b.

17. A user telephone system programed to perform the operations comprising:
when receiving an incoming call from a caller, sending a request to the caller to indicate the urgency level of the call; comparing the urgency level indicated by the caller to a prescribed list of urgency levels; and,
wherein when the indicated level of urgency is above the prescribed level, the operation further comprise:
a. alerting the user to the call;
b. establishing an audio channel of communication enabling the user to converse with the caller;
sending a signal to the caller indicating that the telephone system is in a special operating mode and that an audio channel has been established, thereby informing the caller that the user will attend to the call momentarily and that the caller may begin the conversation.

18. The telephone of claim 17, wherein the signal comprises an assigned audible tone.

19. The telephone of claim 17, wherein the signal comprises a prerecorded audio message.

* * * * *